(12) United States Patent
Kim et al.

(10) Patent No.: US 6,738,391 B1
(45) Date of Patent: May 18, 2004

(54) METHOD FOR ENHANCING VOICE QUALITY IN CDMA COMMUNICATION SYSTEM USING VARIABLE RATE VOCODER

(75) Inventors: Young-Jin Kim, Yongin-shi (KR); Heon-Joo Jee, Yongin-shi (KR)

(73) Assignee: Samsung Electronics Co, Ltd. (KR)

( * ) Notice: Subject to any disclaimer, the term of this patent is extended or adjusted under 35 U.S.C. 154(b) by 0 days.

(21) Appl. No.: 09/520,862

(22) Filed: Mar. 7, 2000

(30) Foreign Application Priority Data

Mar. 8, 1999 (KR) ......................................... 1999-07569

(51) Int. Cl.⁷ ................................................. H04J 3/22
(52) U.S. Cl. ....................................... 370/468; 370/335
(58) Field of Search .............................. 370/468, 479, 370/493, 335, 342, 522

(56) References Cited

U.S. PATENT DOCUMENTS

| 5,515,375 A | * | 5/1996 | DeClerck ................... 370/468 |
| 5,535,239 A | * | 7/1996 | Padovani et al. ........... 370/209 |
| 5,568,483 A | | 10/1996 | Padovani et al. ............. 370/84 |
| 5,778,030 A | * | 7/1998 | Bruckert et al. ............ 375/317 |
| 6,070,089 A | * | 5/2000 | Brophy et al. .............. 370/522 |
| 6,351,495 B1 | * | 2/2002 | Tarraf ........................ 375/259 |

* cited by examiner

*Primary Examiner*—Chi Pham
*Assistant Examiner*—Keith M. George
(74) *Attorney, Agent, or Firm*—Mills & Onello LLP (57) ABSTRACT

A CDMA communication system including a variable rate vocoder transmits voice data without restriction of an encoding rate of the vocoder and transmits a signaling message so that voice quality of the CDMA communication system can be improved. If the signaling message is an emergent signaling message to be transmitted within a certain time, the encoding rate of the vocoder is restricted to a half rate, a quarter rate, or an eighth rate. Thus, the signaling message can be transmitted with the voice data within the certain time, so that delay of the signaling message transmission can be prevented.

8 Claims, 7 Drawing Sheets

METHOD FOR ENHANCING VOICE QUALITY IN CDMA COMMUNICATION SYSTEM USING VARIABLE RATE VOCODER

FIELD OF THE INVENTION

The present invention relates to a code division multiple access (CDMA) communication system, and more particularly to a method for enhancing voice quality of a CDMA communication system transmitting a voice signal and a signaling message by control of an encoding rate of a variable rate vocoder.

BACKGROUND OF THE INVENTION

In a CDMA communication system, a speech signal or voice signal from a microphone is encoded by a vocoder. The vocoder has variable encoding rates corresponding to the speech signal, and outputs encoded voice data depending on the encoding rate. A central processing unit (CPU) provides a signaling message or a transmit message, which includes information such as commands and control signals required to communicate with a base station, by detecting an encoding rate of the voice data. Thus, the CPU controls the encoding rate of the vocoder to transmit the signaling message.

The signaling message is formatted to a specific format to be transmitted as a packet composed of the signaling message itself, or composed of the signaling message and the encoded voice data. The signaling message and the encoded voice data are transmitted through a traffic channel.

The variable rate vocoder included in the CDMA communication system has various encoding rates. Generally, the vocoder encodes the voice data at one of the encoding rates, such as a full rate, a half (½) rate, a quarter (¼) rate, and an eighth (⅛) rate. For transmitting the voice data through the CDMA traffic channel, the vocoder selects a suitable encoding rate corresponding to the speech signal from a user to prevent degradation of voice quality. In addition, the vocoder determines whether the selected encoding rate is between a maximum encoding rate and a minimum encoding rate received from the CPU, and adjusts the selected encoding rate to the maximum/minimum encoding rate when the selected encoding rate is not between the maximum and minimum encoding rates. The CPU restricts the encoding rates of the vocoder to transmit the signaling message.

Figure 1:
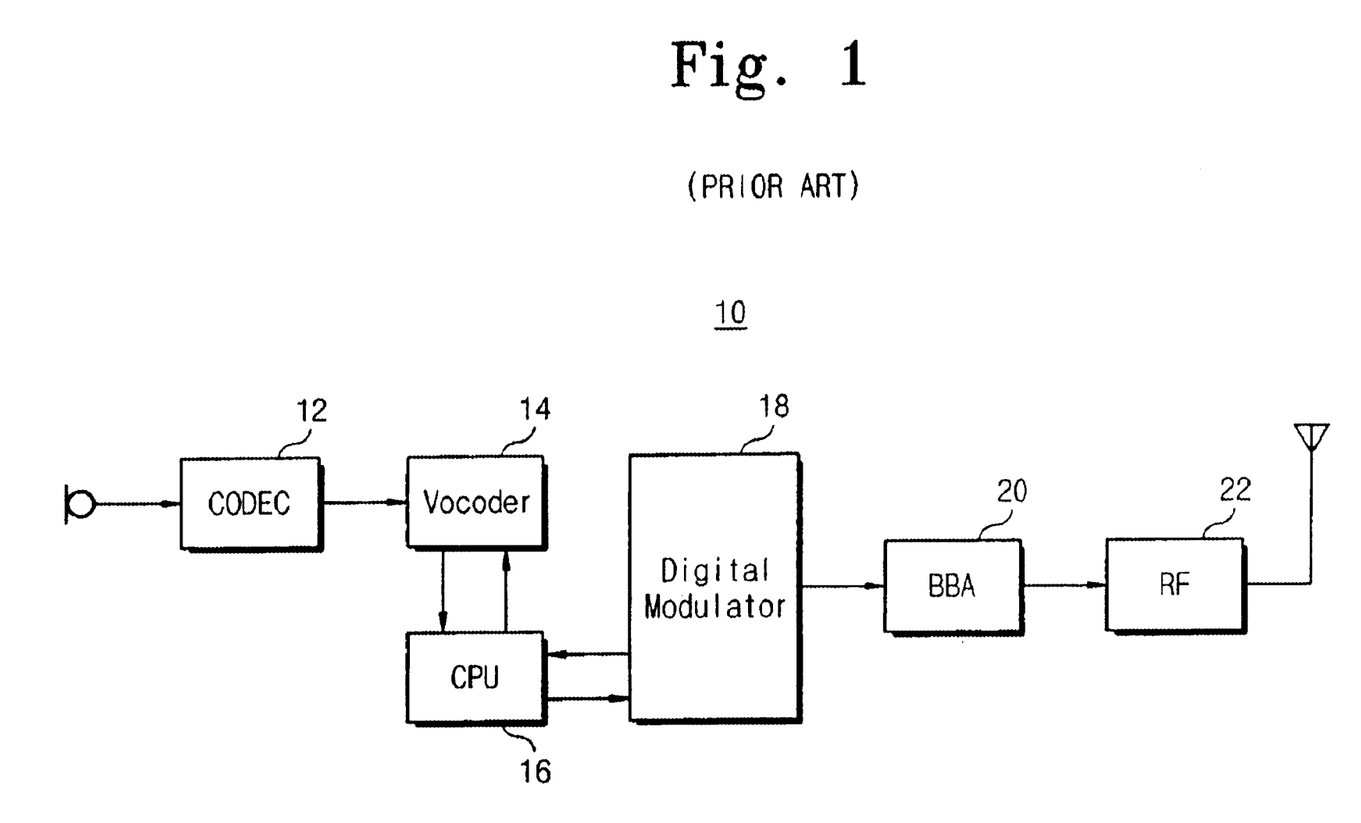
FIG. 1 is a schematic block diagram illustrating a conventional CDMA communication system with a variable rate vocoder.

FIG. 1 is a block diagram illustrating a conventional CDMA mobile station 10 with a variable rate vocoder 14. Referring to FIG. 1, the CDMA communication system 10 comprises a coder-decoder (CODEC) 12, the variable rate vocoder 14, a CPU 16, a digital modulator 18, a baseband analog (BBA) processor 20, and a radio frequency (RF) transmitter 22.

The CODEC 12 converts an analog speech signal from a microphone to a digital speech signal. The variable rate vocoder 14 encodes the digital speech signal at one of various encoding rates corresponding to a characteristic of the speech signal and outputs encoded voice data to the CPU 16. The CPU 16, running under control of a control program, processes the encoded voice data from the vocoder 14 and transmits the processed voice data to the digital modulator 18. The digital modulator 18 modulates a packet of data received from the CPU 16 and spreads the spectrum of the modulated packet data. The BBA processor 20 coupled between the digital modulator 18 and the RF transmitter 22 receives the spread spectrum data from the digital modulator 18 and converts it to a baseband signal. The RF transmitter 22 receives the baseband signal and converts it to an RF signal. The RF transmitter 22 amplifies the RF signal and outputs the amplified RF signal to an antenna for communication to a base station.

In the above described process, if a frame packet including the encoded voice data is not sufficiently large to insert the signaling message, the CPU 16 controls the vocoder 14 to encode the voice data at a lower encoding rate compared to a present encoding rate. When the vocoder 14 is operated at the lower rate, a frame has a packet assembly for transmitting both the voice data and the signaling message.

For example, when the present frame contains the signaling message to be transmitted, if the digital speech signal is encoded to above 80 bits by the vocoder 14 at the full rate, the remaining bits, i.e., the bits other than the encoded 80 bits cannot be transmitted in the present frame. To solve this problem, the CPU 16 controls the vocoder 14 to operate at a lower encoding rate, for example, a ½, ¼ or ⅛ rate, to encode the voice data within the 80 bits. As a result, the voice quality of the CDMA communication system is degraded.

Figure 2A:
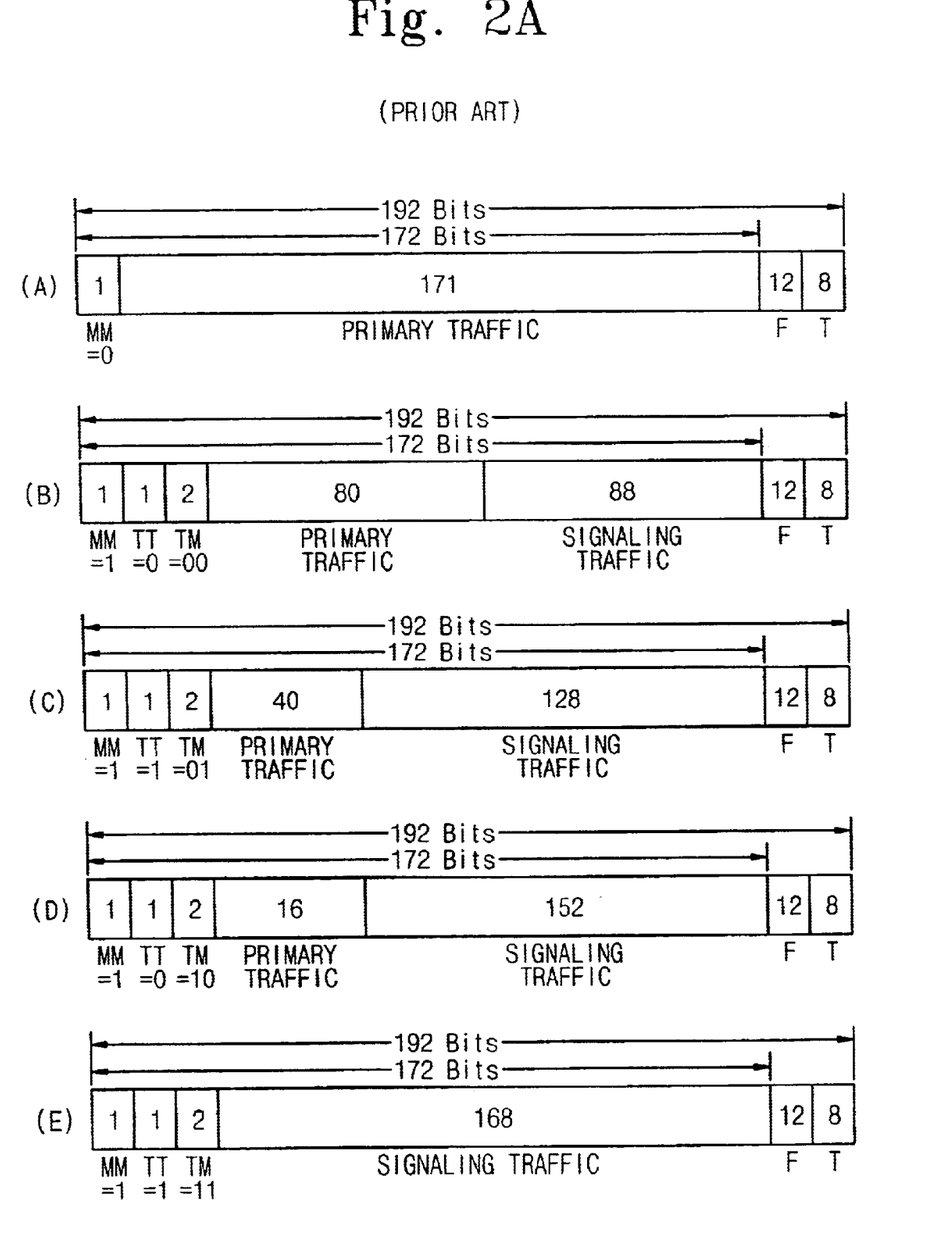
FIGS. 2A and 2B contain schematic diagrams illustrating frame packet formats for the various data rates, types and modes of rate set 1.
Figure 2B:
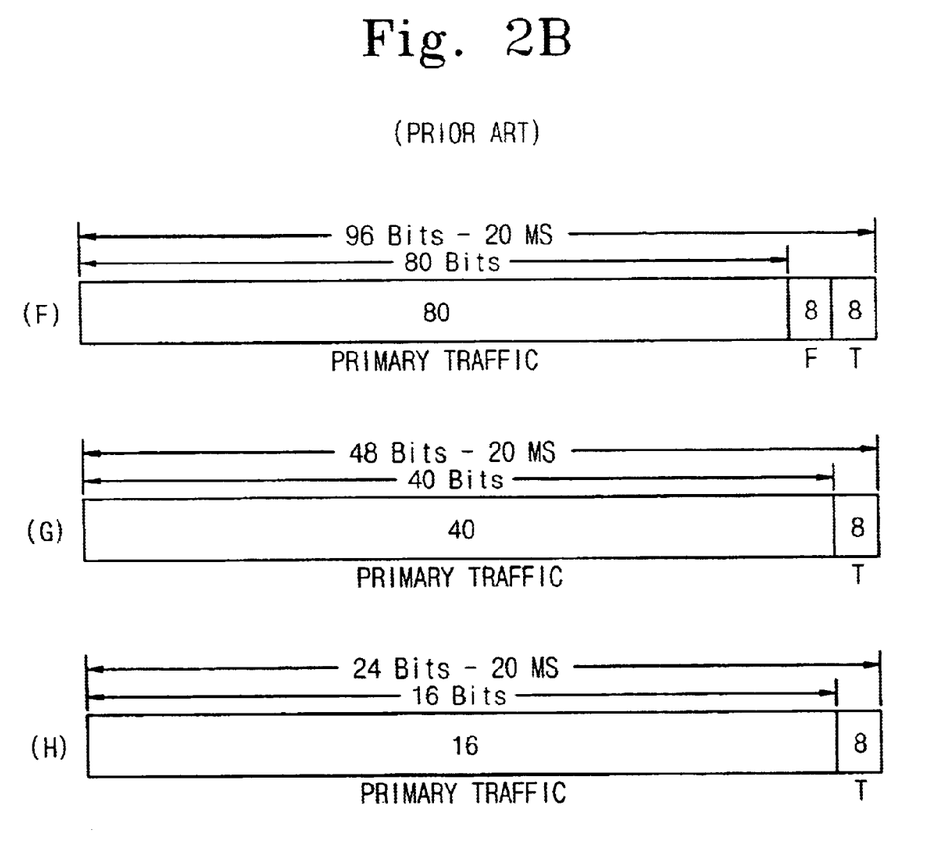

FIGS. 2A and 2B are diagrams illustrating frame formats for the various data rates, types and modes of rate set 1. These frame formats are illustrated in U.S. Pat. No. 5,568,483 to Padovani et al., issued on Oct. 22, 1996, entitled, "METHOD AND APPARATUS FOR THE FORMATTING OF DATA FOR TRANSMISSION." Referring to FIG. 2A, frames A–E are provided at a 9,600 bps (i.e., 9.6 kbps) rate, consist of 192 bits in length, and span 20 ms in time. Frames A–E include a single mixed mode bit MM, auxiliary format bits if present, message bits, a 12-bit frame quality indicator F, and 8 tail bits T. The frame formats shown FIGS. 2A and 2B are well known to a person of ordinary skill in the art, so that their detailed explanation will be omitted.

As shown in FIG. 2A, frame A is a 9,600 bps frame for the transmission of primary traffic only, which includes user speech. Frame B is a 9,600 bps dim and burst frame for the transmission of ½ rate primary traffic and signaling traffic. Frame C is a 9,600 bps dim and burst frame for the transmission of ¼ rate primary traffic and signaling traffic. Frame D is a 9,600 bps dim and burst frame for the transmission of ⅛ rate primary traffic and signaling traffic. Frame E is a 9,600 bps blank and burst frame for the transmission of signaling traffic, such as command and control signals.

Referring to FIG. 2B, frame F is a 4,800 bps (i.e., 4.8 kbps) frame for the transmission of ½ rate primary traffic only. Frame G is a 2,400 bps (i.e., 2.4 kbps) frame for the transmission of ¼ rate primary traffic only. Frame H is a 1,200 bps (i.e., 1.2 kbps) frame for the transmission of ⅛ rate primary traffic only.

The encoding rate of the next frame of the vocoder 14 is defined by the CPU 16 in response to the various encoding rates of the present frame or an existence of the signaling message. Therefore, the CPU 16 can output the voice data and/or signaling message to the digital modulator 18 in an appropriate frame packet format, which is selected from the frame packet formats shown in FIGS. 2A and 2B.

For example, if the present frame is a normal frame, the signaling message to be transmitted does not exist. Thus, the vocoder 14 generates the packet composed of only voice data, in response to one of the various encoding rates corresponding to characteristics of the voice data being encoded. Frame A of FIG. 2A and frames F, G and H of FIG.

2B correspond to this case. These frames are transmitted at 9,600 bps, 4,800 bps, 2,400 bps and 1,200 bps rates, respectively. In that case, the voice quality of the CDMA communication system is not affected.

If the present frame is a blank and burst frame, the voice data to be transmitted does not exist. In that case, the packet is composed of only a signaling message, so that the vocoder 14 generates the packet composed of only a signaling message. Frame E of FIG. 2A corresponds to this case. In that case, the voice quality is not affected.

And if the present frame is a dim and burst frame, the maximum number of bits capable of loading the voice data as the primary traffic bits are restricted to 80 bits as shown for example as frame B of FIG. 2A. In that case, if the voice data is encoded at the full rate (i.e., more than 80 bits) although the signaling message to be transmitted exists in the present frame, the remaining bits excepting the 80 bits cannot be transmitted in the present frame. To prevent this problem, the encoding rate of the variable rate vocoder 14 is restricted within the ½ rate under control of the CPU 16, so as to encode the voice data within 80 bits. Thus, in this case, the voice quality of the CDMA communication system is degraded. Frames B, C and D of FIG. 2A correspond to this case.

As described above, when the vocoder of the conventional CDMA communication system transmits both encoded voice data and the signaling message, the encoding rate of the vocoder is restricted under compulsion by the CPU. Thus, the voice quality of the CDMA communication system is degraded.

SUMMARY OF THE INVENTION

It is therefore an object of the present invention to provide a method for enhancing voice quality of a CDMA communication system transmitting a voice signal and a signaling message by control of encoding rate of a variable rate vocoder.

In order to attain the above objects, according to an aspect of the present invention, there is provided a method for transmitting data by a variable rate vocoder included in a CDMA communication system. The data can include an encoded voice data and/or a signaling message. In accordance with the method, a mode of a present frame is detected, wherein the mode can be a normal mode for transmitting the voice data, a blank and burst mode for transmitting the signaling message, or a dim and burst mode for transmitting both the voice data and the signaling message. An encoding rate of a present frame is determined by reading out the voice data of the present frame, wherein the encoding rate can be a full rate, a half rate, a quarter rate, or an eighth rate. A counting value is increased when the determined encoding rate is the full rate. A packet to be transmitted in the present frame corresponding to the mode of the present frame is generated. A mode of a next frame is determined in response to existence of the signaling message to be transmitted in the next frame and the mode of the present frame, the packet is transmitted. These steps are repeated until all of the voice data and/or the signaling messages are transmitted.

In one embodiment, in detecting a mode of the present frame, it is determined whether the counting value is greater than a predetermined reference value when the mode of the present frame is the dim and burst mode. If so, a maximum encoding rate of the present frame is restricted to the half rate. If not, the maximum encoding rate of the present frame is restricted to the full rate. The counting value can represent a number of times of operation of the vocoder at the full rate. Alternatively, the counting value can represent an operating time of the vocoder at the full rate. The reference value can represent a permitted limit of an emergent state of the signaling message. Alternatively, the reference value can represent a response rate of the signaling message.

In one embodiment, the generated packet includes only voice data when the restricted maximum encoding rate is the full rate. The signaling message not transmitted with the voice data can be transmitted with other voice data if necessary when the encoding rate is changed from the full rate to another rate in the dim and burst mode. The generated packet can include both the voice data and the signaling message when the restricted maximum encoding rate is the half rate.

In one embodiment, in determining the mode of the next frame, it is determined whether the signaling message to be transmitted in the next frame exists. If not, the counting value is reset and the mode of the next frame is determined to be the normal mode. The maximum value is redefined when the signaling message exists. The mode of the next frame is determined to be the dim and burst mode when the present frame is the dim and burst mode. The mode of the next frame is determined to be the blank and burst mode when the present frame is the blank and burst mode.

According to the method of the invention, voice quality of the CDMA communication system can be improved, since the CDMA communication system transmits the voice data without restriction of the encoding rate of the vocoder and transmits the signaling message if necessary when a mode of the present frame is a dim and burst mode and an encoding rate is a full rate.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

Figure 3:
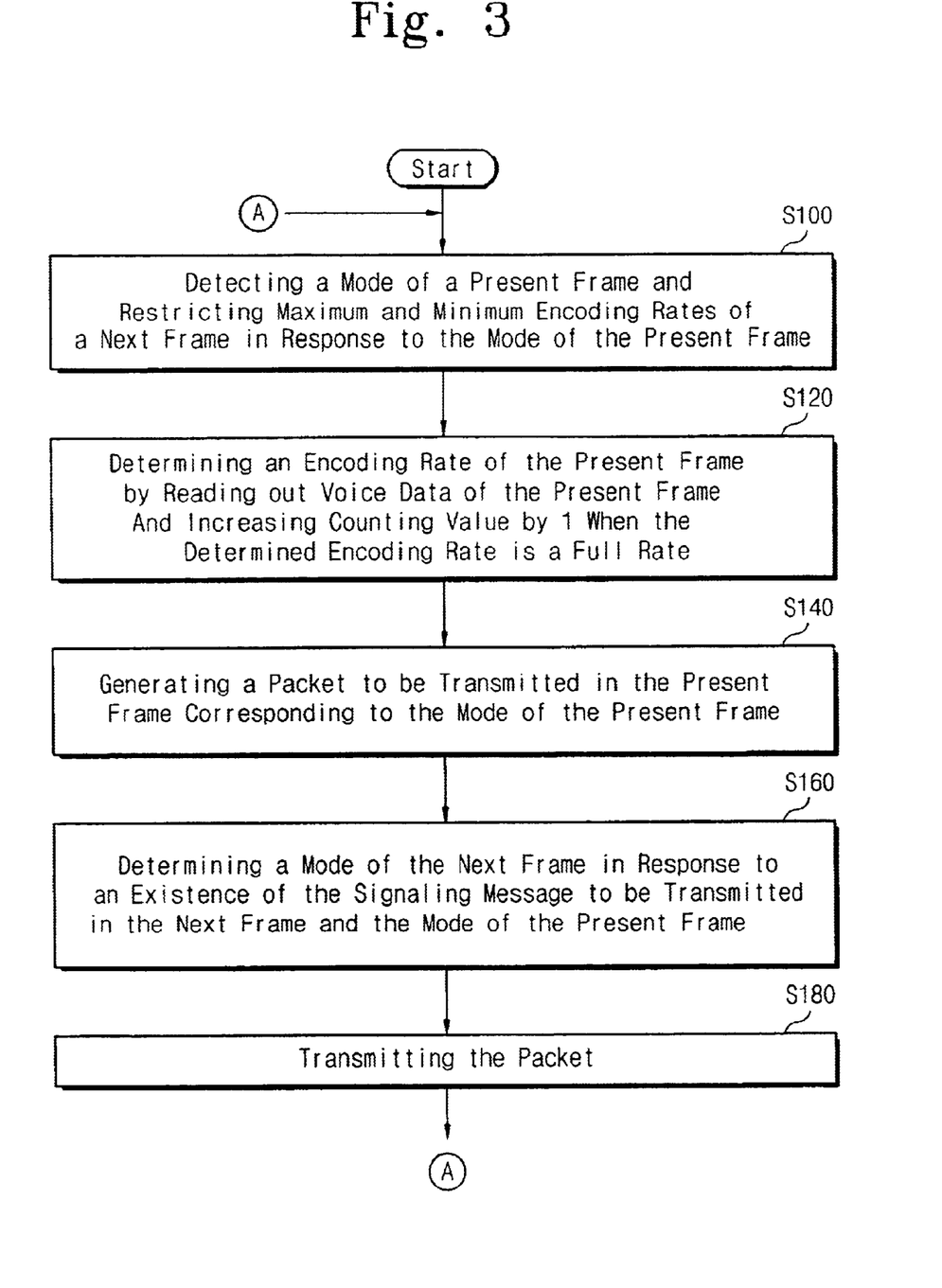
FIG. 3 is a flowchart illustrating a method for transmitting a voice data and/or a signaling message at various encoding rates of a variable rate vocoder according to the present invention.

FIG. 3 is a flowchart illustrating one embodiment of a method for transmitting voice data and/or a signaling message at various encoding rates of a variable rate vocoder included in a CDMA communication system according to the present invention. The CDMA communication system of the invention includes essentially similar hardware to that described in connection with FIG. 1. Accordingly, description of the system hardware will be omitted to avoid repetition.

The flow is performed by a control program of a CPU, in response to encoding rates of the vocoder. The control program includes a predetermined maximum value MAX expressing a permitted limit of an emergent state of the signaling message or a response rate. The program counts the number of times of operation or an operating time of the vocoder at the full rate. If the counted value is greater than the maximum value MAX, the program generates and forwards counting information to the CPU to restrict the encoding rate of the vocoder.

Referring to FIG. 3, at step S100, the CPU detects the mode of the present frame. The possible modes include a normal mode, a dim and burst mode and a blank and burst mode. The CPU then defines the maximum and the minimum encoding rates of the next frame in response to the detected mode of the present frame. At step S120, the encoding rate of the present frame is determined by reading out the voice data of the present frame. In that case, if the determined encoding rate is the full rate, a counting value CNT of the full rate is increased by 1, in order to compare the counting value CNT with the maximum value MAX. The counting value CNT expresses the number of times of operation or the operating time of the vocoder at the full rate. At step S140, the packet to be transmitted in the present frame is generated corresponding to the mode of the present frame. At step S160, the mode of the next frame is determined in response to the existence of the signaling message to be transmitted in the next frame and the mode of the present frame, and then the control flow proceeds to step S180. At step S180, the packet is transmitted. Next, the control flow proceeds to step A, so as to repeat the steps S100 to S180 until all of the packets are transmitted.

Figure 4:
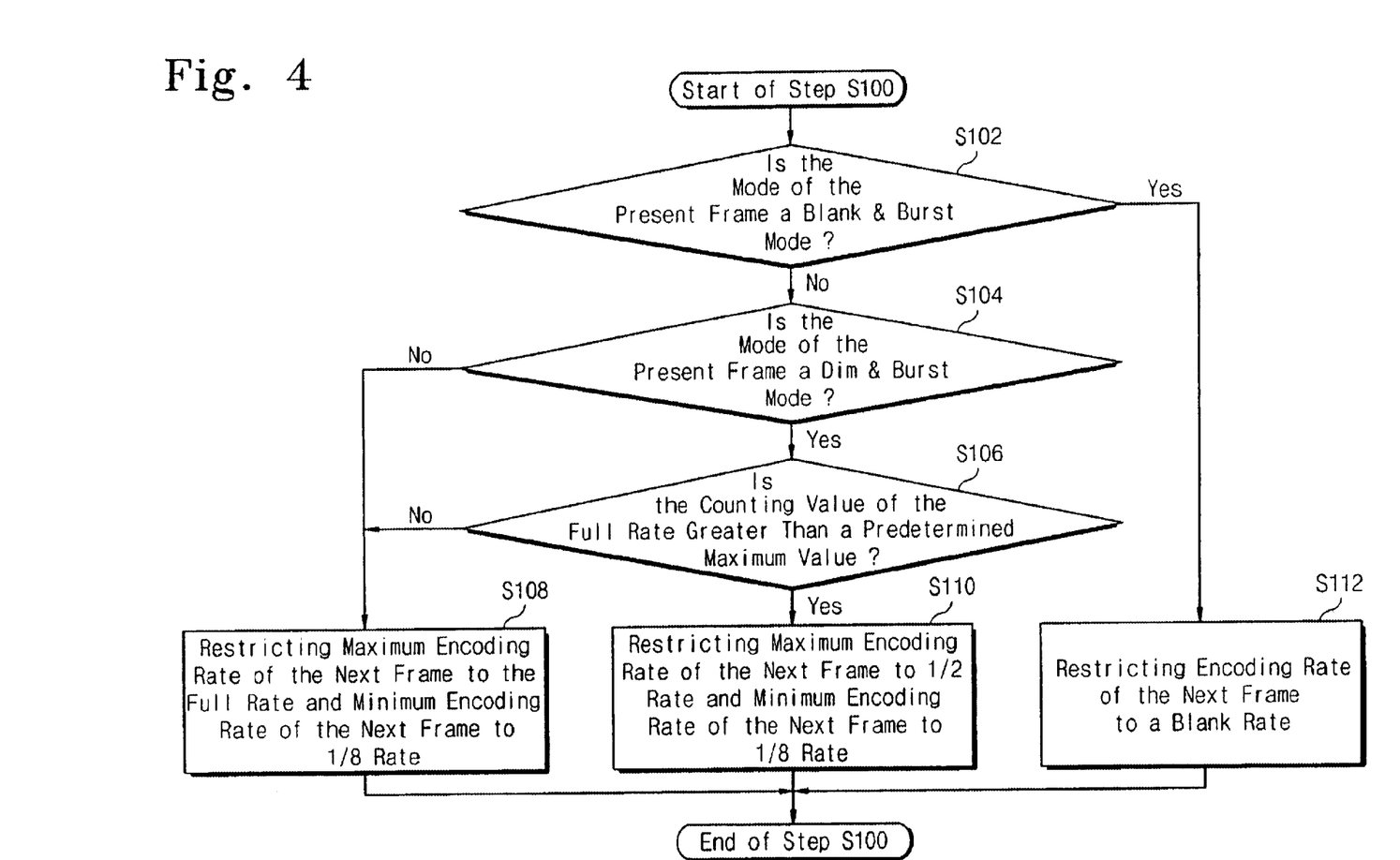
FIG. 4 is a detailed flow chart illustrating step S100 of FIG. 3.

FIG. 4 is a detailed flow chart illustrating step S100 of FIG. 3. Referring to FIG. 4, at step S102, it is determined whether the mode of the present frame is the blank and burst mode for transmitting the signaling message. In other words, at step S102, it is determined whether the present frame is the blank and burst frame. If so, the control flow proceeds to step S112, wherein the encoding rate of the next frame is restricted to a blank rate. If not, the control flow proceeds to step S104, wherein it is determined whether the present frame is the dim and burst frame for transmitting both the voice data and the signaling message. If the present frame is not the dim and burst frame, i.e., if the present frame is the normal frame, the flow continues to step S108. At step S108, the maximum encoding rate is restricted to the full rate and the minimum encoding rate is restricted to the ⅛ rate. Alternatively, if the present frame is the dim and burst frame, the flow continues to step S106, wherein the counting value CNT of the full rate is compared with the predetermined maximum value MAX. In that case, if the counting value CNT is greater than the maximum value MAX, the flow continues to step S110. At step S110, the maximum encoding rate is restricted to the ½ rate and the minimum encoding rate is restricted to the ⅛ rate. If the counting value CNT is not greater than the maximum value MAX, the flow continues to step S108, wherein the encoding rate is restricted in order that the vocoder is operated in the normal mode.

Figure 5:
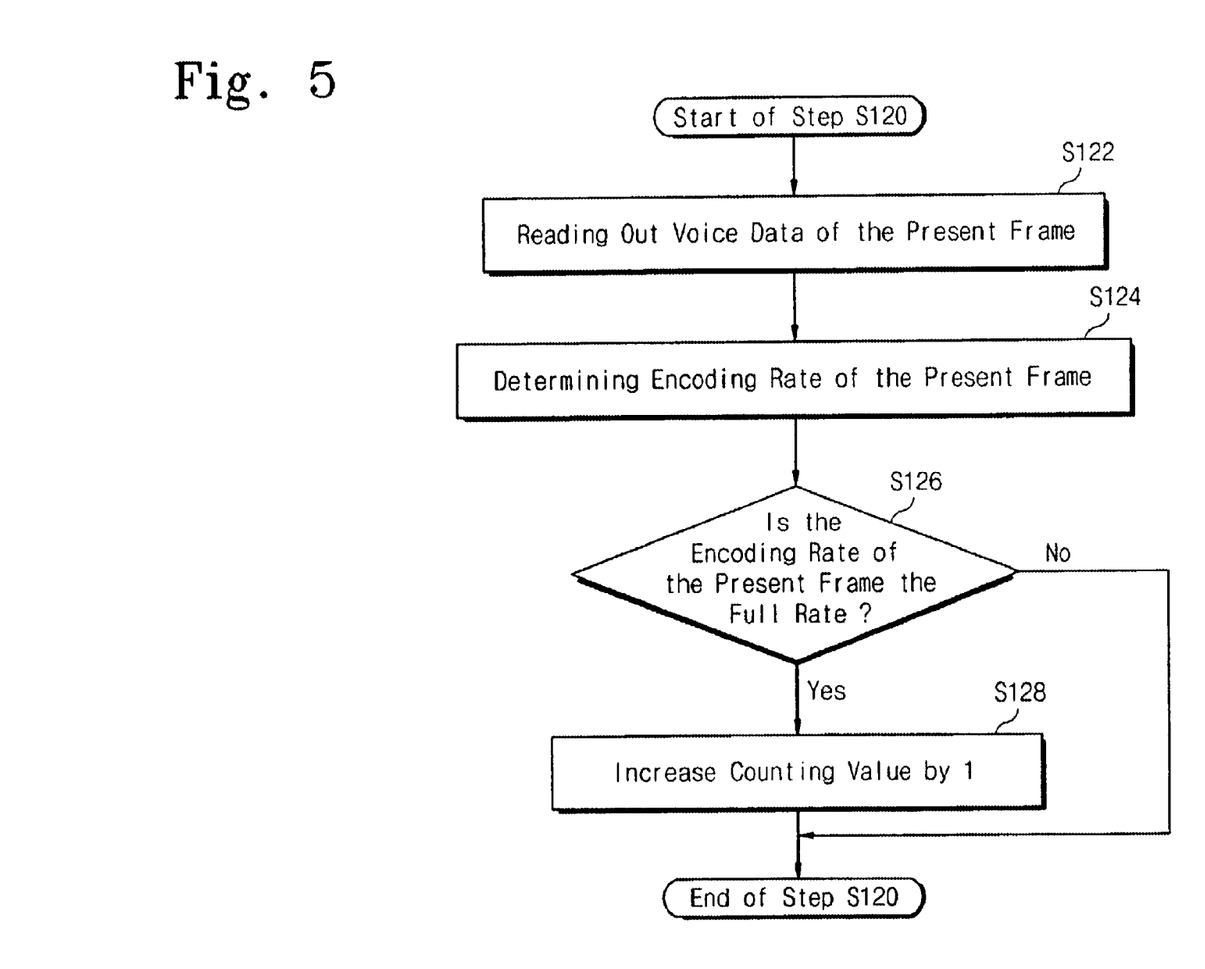
FIG. 5 is a detailed flow chart illustrating step S120 of FIG. 3.

FIG. 5 is a detailed flow chart illustrating step S120 of FIG. 3. Referring to FIG. 5, at step S122, the voice data of the present frame is read out. At step S124, the vocoder determines the encoding rate of the present frame in response to the read out voice data. At step S126, it is determined whether the encoding rate of the present frame is the full rate. If so, the control flow proceeds to step S128, wherein the counting value CNT of the full rate is increased by 1. If not, it is not counted in the number of times of operation or the operating time of the vocoder.

Figure 6:
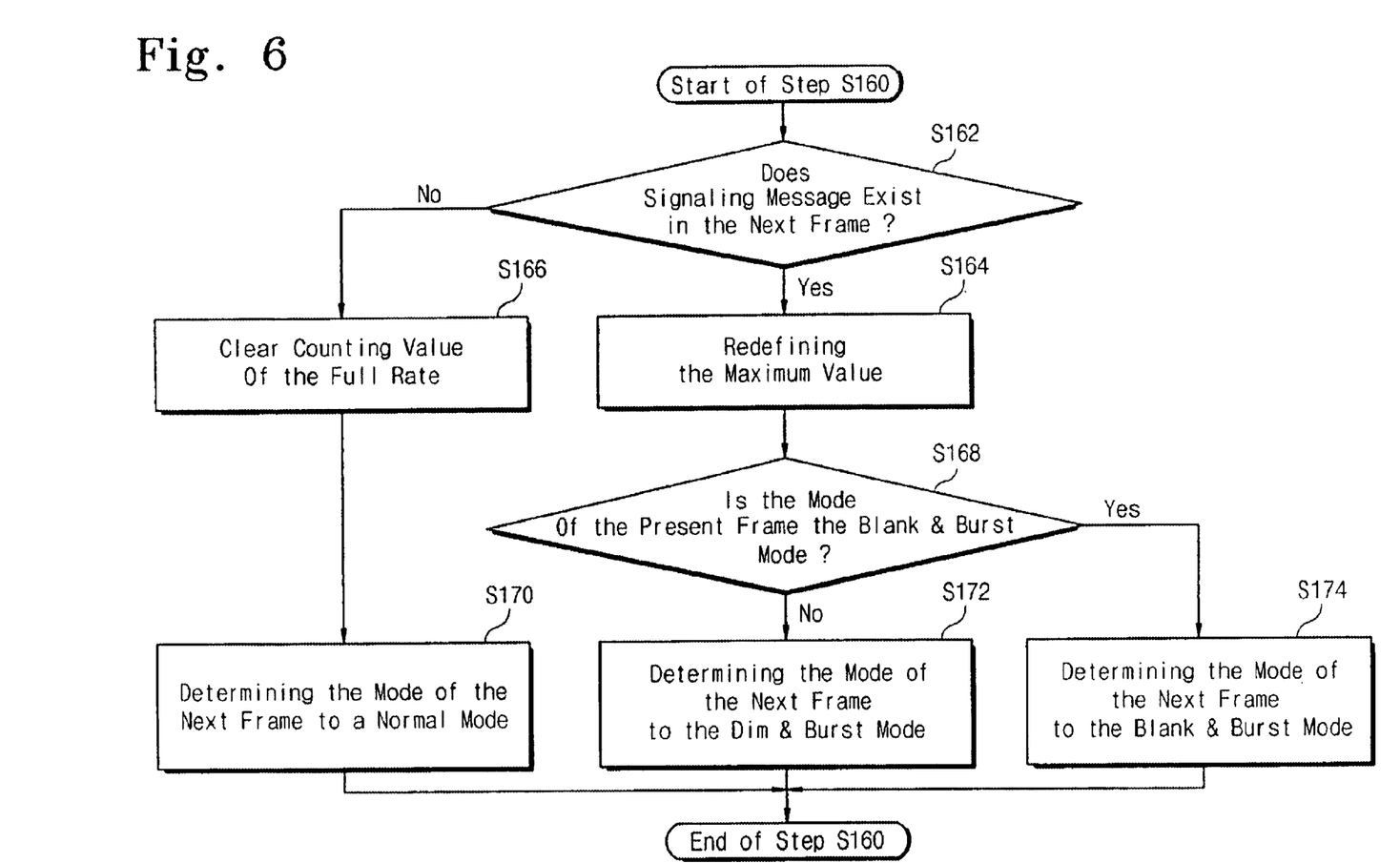
FIG. 6 is a detailed flow chart illustrating step S160 of FIG. 3.

FIG. 6 is a detailed flow chart illustrating step S160 of FIG. 3. Referring to FIG. 6, at step S162, it is determined whether the signaling message to be transmitted in the next frame exists or not. If so, the flow continues to step S164, wherein the maximum value MAX of the full rate is redefined in order to redefine an acceptable time for transmitting the signaling message in the case that different signaling messages are not transmitted continuously. At step S168, it is determined whether the mode of the present frame is the blank and burst mode. If so, the flow continues to step S174, wherein the mode of the next frame is set to the blank and burst mode. If not, the flow continues to step S172, wherein the mode of the next frame is set to the dim and burst mode.

In addition, at the step S162, if the signaling message to be transmitted in the next frame does not exist, the control flow proceeds to step S166. At step S166, the counting value CNT of the full rate is cleared, and then the flow continues to step S170. At step S170, the mode of the next frame is set to the normal mode for transmitting the voice data.

As described above, the variable rate vocoder determines the encoding rate before everything else when the signaling message to be transmitted in the present frame exists. At this time, if the determined encoding rate is the ½, the ¼, or the ⅛ rate, the voice data is transmitted with the signaling message as illustrated in the frame packet formats B, C and D of FIG. 2A. In that case, if the voice data does not exist, only the signaling message is transmitted, so that the voice quality is not affected. However, if the encoding rate determined by the vocoder is the full rate, the vocoder according to the present invention transmits only voice data as illustrated in the frame packet format A of FIG. 2A, although the signaling message exists in the present frame. In that case, the encoding rate of the vocoder is not restricted compulsorily to the lower encoding rate by the CPU, so that the voice quality is not affected. When the encoding rate is changed from the full rate to another encoding rate (for example, ½, ¼ or ⅛ rate), the signaling message not transmitted at the full rate can be transmitted with voice data in response to the changed encoding rate. In that case, if the voice data does not exist, the vocoder transmits only the signaling message, so that the voice quality is not affected.

In the dim and burst mode, if the encoding rate determined by the variable rate vocoder is continually the full rate, the signaling message cannot be transmitted during this condition. If the signaling message is an emergent message to be transmitted within a certain time as a response message to another party, it cannot wait until the encoding rate is changed from the full rate to another encoding rate (for example, ½, ¼ or ⅛ rate). In that case, if the variable rate vocoder encodes continually at the full rate after receiving the signaling message to make a response, the CPU counts the counting value CNT of the full rate. At this time, the CPU controls the vocoder to determine the encoding rate till a time permitted in response to a maximum waiting time of the other party or the emergent information. After that time, the CPU restricts the encoding rate of the vocoder in order that the vocoder transmits both the voice data and the signaling message.

As described above, the CDMA communication system according to the present invention transmits the voice data without restriction of the encoding rate of the vocoder and transmits the signaling message if necessary when the mode of the present frame is the dim and burst mode and the encoding rate is the full rate. Thus, the voice quality of the CDMA communication system can be improved. In that case, if the signaling message is the emergent message to be transmitted within a certain time, the encoding rate of the vocoder is restricted to the lower encoding rate, such as the ½ rate, the ¼ rate and the ⅛ rate. Thus, the signaling message can be transmitted with the voice data within the certain time. Therefore, a delay of the signaling message transmission can be prevented.

While this invention has been particularly shown and described with references to preferred embodiments thereof, it will be understood by those skilled in the art that various changes in form and details may be made therein without departing from the spirit and scope of the invention as defined by the following claims.

What is claimed is:

1. A method for transmitting data by a variable rate vocoder included in a CDMA communication system, said data including at least one of encoded voice data and a signaling message, the method comprising the steps of:

(a) detecting a mode of a present frame of the data, wherein the mode is one of a normal mode for transmitting the voice data, a blank and burst mode for transmitting the signaling message, and a dim and burst mode for transmitting both the voice data and the signaling message;

(b) determining an encoding rate of the present frame by reading out the voice data of the present frame, wherein the encoding rate is one of a full rate, a half rate, a quarter rate, and an eighth rate;

(c) increasing a counting value when the determined encoding rate is the full rate;

(d) generating a packet to be transmitted in the present frame corresponding to the mode of the present frame;

(e) determining a mode of a next frame in response to existence of the signaling message to be transmitted in the next frame and the mode of the present frame;

(f) transmitting the generated packet; and (g) repeating steps (a) through (f) until all of the voice data and/or the signaling messages are transmitted; wherein the detecting step comprises the steps of:

determining whether the counting value is greater than a predetermined reference value when the mode of the present frame is the dim and burst mode, the reference value representing a response rate of the signaling message;

restricting a maximum encoding rate of the present frame to the half rate when the counting value is greater than the reference value in the dim and burst mode; and restricting the maximum encoding rate of the present frame to the full rate when the counting value is not greater than the reference value in the dim and burst mode.

2. The method of claim 1, wherein the counting value represents a number of times of operation of the vocoder at the full rate.

3. The method of claim 1, wherein the counting value represents an operating time of the vocoder at the full rate.

4. The method of claim 1, wherein the reference value represents a permitted limit of an emergent state of the signaling message.

5. The method of claim 1, wherein the generated packet is composed of only voice data when the restricted maximum encoding rate is the full rate.

6. The method of claim 5, wherein the signaling message not transmitted with the voice data is transmitted with other voice data, when the encoding rate is changed from the full rate to another rate in the dim and burst mode.

7. The method of claim 1, wherein the generated packet is composed of both the voice data and the signaling message when the restricted maximum encoding rate is the half rate.

8. The method of claim 1, wherein the step of determining the mode of the next frame comprises the steps of:

determining whether the signaling message to be transmitted in the next frame exists;

resetting the counting value when the signaling message to be transmitted in the next frame does not exist, and determining the mode of the next frame to be the normal mode;

redefining the maximum value when the signaling message exists;

determining the mode of the next frame to be the dim and burst mode when the present frame is the dim and burst mode; and determining the mode of the next frame to be the blank and burst mode when the present frame is the blank and burst mode.

* * * * *

UNITED STATES PATENT AND TRADEMARK OFFICE
CERTIFICATE OF CORRECTION

PATENT NO.    : 6,738,391 B1
DATED         : May 18, 2004
INVENTOR(S)   : Yoshikazu Ikenoue et al.

It is certified that error appears in the above-identified patent and that said Letters Patent is hereby corrected as shown below:

<u>Title page</u>,
Item [57], ABSTRACT,
Line 12, after "data", delete ",".

<u>Column 1</u>,
Lines 6 and 7, delete "No.08/ 327,223", and insert -- No. 08/327,223 --.
Line 17, delete "copy.", and insert -- copying. --.
Line 19, delete "are", and insert -- have been --.
Line 20, delete "copy right", and insert -- copyrights --.
Line 25, after "generation", delete "of".
Line 33, after "easy", insert -- to produce --.
Line 43, delete "moneys", and insert -- money --.

<u>Column 2</u>,
Line 35, delete "an".
Lines 42 and 43, delete "with naked eyes", and insert -- with the naked eye --.
Line 48, after "disk", delete ",", and insert -- . --.
Lines 49 and 60, delete "an".
Line 52, after "includes", delete "an".

<u>Column 3</u>,
Lines 7, 14 and 44 delete "an".
Line 20, delete the second instance of "an", and insert -- a --.

<u>Column 4</u>,
Line 36, after "embedding", delete "a".

<u>Column 5</u>,
Line 25, after "produced,", delete "a".
Lines 26 and 53, delete "an".
Line 28, delete "with naked eyes", and insert -- with the naked eye --.

<u>Column 6</u>,
Line 2, delete "An additional", and insert -- Additional --.
Line 4, delete "an".
Line 29, after "add", delete "an".
Line 34, after "is", delete "a".
Line 43, after "source,", delete "a".
Lines 59 and 60, delete "(refer FIG. 2)," and insert -- (refer to FIG. 2), --.

UNITED STATES PATENT AND TRADEMARK OFFICE
CERTIFICATE OF CORRECTION

PATENT NO. : 6,738,391 B1
DATED : May 18, 2004
INVENTOR(S) : Yoshikazu Ikenoue et al.

It is certified that error appears in the above-identified patent and that said Letters Patent is hereby corrected as shown below:

Column 7,
Line 6, delete "An additional data is a digital data", and insert -- Additional data is digital data --.
Line 8, after "of", delete "an".
Line 11, delete "An additional data is expressed as a continuous data", and insert -- Additional data is expressed as continuous data --.
Line 13, delete "data-can", and insert -- data can --.
Line 22, after "is", delete "a".
Line 22, after "and", delete "a".
Line 26, after "of", delete "an".
Lines 28, 31, 36, 39, 45 and 59, delete "an".
Line 30, delete both instances of "a".
Line 62, delete both instances of "an".
Line 64, delete "each".
Line 64, after "copy,", delete "a".

Column 8,
Lines 2 and 3, delete "a".
Line 6, delete "different a little", and insert -- a little different --.
Line 10, delete "A block", and insert -- Block --.
Lines 16, 24, 31, 33, 38, 47, 50, 53, 56 and 63, delete "an".
Line 26, after "oval.", delete "a".
Line 32, delete "with naked eyes", and insert -- with the naked eye --.
Line 44, after the first instance of "a", delete ".".
Line 49, delete "is", and insert -- are --.
Line 54, delete the second instance of "an".

Column 9,
Line 6, delete "A long", and insert -- Long --.
Line 9, after "as", delete "a".
Lines 10, 13, 54, 55 and 57, delete "an".
Line 22, delete "was".
Line 24, delete "how much was".
Line 25, after "document", insert -- , --.
Line 34, delete "is omitted to be displayed", and insert -- are not displayed --.
Line 61, after "embeds", delete "a".

Column 10,
Line 4, delete the first instance of "a".
Lines 8 and 34, delete "an".
Line 39, delete "copy right", and insert -- copyright --.

UNITED STATES PATENT AND TRADEMARK OFFICE
CERTIFICATE OF CORRECTION

PATENT NO. : 6,738,391 B1
DATED : May 18, 2004
INVENTOR(S) : Yoshikazu Ikenoue et al.

It is certified that error appears in the above-identified patent and that said Letters Patent is hereby corrected as shown below:

Column 10 (cont'd),
Line 52, delete "plays roles", and insert -- act --.
Line 54, delete "A code", and insert -- Code --.

Column 11,
Line 16, delete "is", and insert -- has --.
Line 39, delete "an".
Line 59, delete both instances of "an".
Line 62, delete both instances of "a".
Line 67, delete the first instance of "an".

Column 12,
Line 7, delete "an image data is waited", and insert -- image data waits --.
Lines 9 and 10, delete "When an image data is received, the data is analyzed. That is", and insert -- When image data is received, the data is analyzed, that is, --.
Lines 12, 32 and 48, delete both instances of "a".
Lines 14, 45, 51 and 59, delete "an".
Line 28, delete both instances of "an".
Line 36, delete the first instance of "an".
Line 43, delete "an image data is waited to be received", and insert -- image data waits to be received --.
Line 59, delete "a".

Column 13,
Lines 3, 6, 17, 20, 32 and 59, delete "an".
Lines 24, 25 and 50, delete "is", and insert -- are --.
Lines 51 and 56, delete "a".
Line 59, delete "that blocks enough", and insert -- that there are enough blocks --.
Line 62, delete "sets of an additional data is", and insert -- sets of additional data are --.

Column 14,
Line 2, delete "this", and insert -- it --.
Lines 9 and 31, delete "an".
Line 11, delete "spaces(step S1326) , and insert -- spaces (step S1326) --.
Line 29, delete "receive", and insert -- received --.
Lines 31 and 34, delete "is", and insert -- are --.
Line 32, delete "(copy", and insert -- copy --.
Line 40, delete the first instance of "an".

UNITED STATES PATENT AND TRADEMARK OFFICE
CERTIFICATE OF CORRECTION

PATENT NO.    : 6,738,391 B1
DATED         : May 18, 2004
INVENTOR(S)   : Yoshikazu Ikenoue et al.

It is certified that error appears in the above-identified patent and that said Letters Patent is hereby corrected as shown below:

Column 15,
Line 57, delete "a".
Line 60, delete "are", and insert -- is--.
Line 62, delete both instances of "is", and for both instances insert -- are --.
Line 63, delete "a data" and insert -- data --.

Column 16,
Line 3, delete "produced newly", and insert -- newly produced --.
Lines 8, 34, 38 and 42, delete "an".
Line 14, delete "secret", and insert -- secrecy --.
Lines 30 and 31, delete "It is added newly when it is decided to be a forged document By the main controller 7", and insert -- It is newly added when decided it is a forged document by the main controller 7 --.
Line 32, delete "each", and insert -- all --.
Line 32, delete "and", and insert -- the --.
Line 43, after "added", delete ".".
Line 44, delete "each", and insert -- all of the --.
Line 53, delete "dots", and insert -- dot --.
Line 66, delete "an" and insert -- the --.

Column 17,
Lines 7 and 46, delete "a".
Line 29, delete "an".
Line 62, delete "(copy", and insert -- copy --.

Column 18,
Line 17, delete "these processing is performed", and insert -- these processes are performed --.
Line 18, delete "is decided".
Line 26, delete "an".
Line 50, delete "number", and insert -- numbers --.
Line 56, delete "a".

Column 19,
Lines 8, 12, 33 and 37, delete "is", and insert -- are --.
Line 14, delete "secrets", and insert -- secret --.
Line 25, delete the first instance of "a".
Line 63, delete "a".
Line 64, delete the first instance of "is", and insert -- are --.

UNITED STATES PATENT AND TRADEMARK OFFICE
CERTIFICATE OF CORRECTION

PATENT NO. : 6,738,391 B1
DATED : May 18, 2004
INVENTOR(S) : Yoshikazu Ikenoue et al.

It is certified that error appears in the above-identified patent and that said Letters Patent is hereby corrected as shown below:

Column 20,
Line 7, delete "copy", and insert -- copying --.
Line 11, after "interfered", insert -- with --.
Lines 14 and 15, delete "An item in a record includes", and insert -- Items in a record include --.
Lines 18 and 33, delete "a".
Line 19, delete "is", and insert -- are --.
Line 37, delete "is", and insert -- has been --.
Lines 38 and 60, delete "secret", and insert -- secrecy --.
Line 39, delete the first instance of "is", and insert -- are --.
Line 39, delete "it".
Line 41, delete "processing", and insert -- process --.
Lines 51, 65 and 67, delete "an".
Line 66, delete "each", and insert -- all --.
Line 67, delete "is" and insert -- are --.

Column 21,
Lines 1 and 8, delete "an".
Line 5, delete "secret", and insert -- secrecy --.
Line 11, delete "is", and insert -- are --.
Line 39, after "name,", insert -- a --.
Line 39, after "of", insert -- a --.
Line 58, delete "is", and insert -- are --.

Column 22,
Line 58, delete "fires", and insert -- first --.

Signed and Sealed this

Sixteenth Day of August, 2005

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,738,391 B1 | Page 1 of 1 |
| APPLICATION NO. | : 09/520862 | |
| DATED | : May 18, 2004 | |
| INVENTOR(S) | : Young-Jin Kim et al. | |

It is certified that error appears in the above-identified patent and that said Letters Patent is hereby corrected as shown below:

This certificate supersedes Certificate of Correction issued August 16, 2005. The certificate should be vacated since no Certificate of Correction was granted for this patent number.

Signed and Sealed this

Seventh Day of August, 2007

JON W. DUDAS
*Director of the United States Patent and Trademark Office*